J. JANICKI.
SPEED REDUCING MECHANISM.
APPLICATION FILED DEC. 4, 1919.

1,382,289.

Patented June 21, 1921.
2 SHEETS—SHEET 1.

Inventor
John Janicki

J. JANICKI.
SPEED REDUCING MECHANISM.
APPLICATION FILED DEC. 4, 1919.

1,382,289.

Patented June 21, 1921.
2 SHEETS—SHEET 2.

Inventor.
John Janicki,
By Eugene E. Warner Atty.

UNITED STATES PATENT OFFICE.

JOHN JANICKI, OF CHICAGO, ILLINOIS, ASSIGNOR TO LEONARD S. SZUMKOWSKI, OF CHICAGO, ILLINOIS.

SPEED-REDUCING MECHANISM.

1,382,289.  Specification of Letters Patent.  Patented June 21, 1921.

Application filed December 4, 1919. Serial No. 342,487.

*To all whom it may concern:*

Be it known that I, JOHN JANICKI, a citizen of the United States, residing at Chicago, in the county of Cook and State of Illinois, have invented new and useful Improvements in Speed-Reducing Mechanisms, of which the following is a specification.

This invention relates to speed reducing mechanisms for motor vehicles so that an additional reduction of speed may be had at the will of the operator between the propeller shaft and the rear or traction wheels of the vehicle, and thus permit the vehicle to be used either as originally designed or for tractor purposes as for pulling heavy loads or gang plows or other farm machinery.

One of the objects of my invention is to make the speed reducing mechanism between each rear vehicle wheel and the differential mechanism of the planetary gear wheel type so that the amount of throw required to shift the parts in making a change of speed is reduced to the minimum, and, further, produce a compact structure enabling the use of but a single casing to house or inclose both of the speed reducing mechanisms and the differential mechanism to require placing the lubricant for all of such parts in but a single casing.

A further object of my invention is to use, in combination with the speed reducing mechanisms, a differential mechanism of the worm drive type, to gain a greater reduction of speed for the traction or rear wheels of the vehicle and thus produce increased traction for said wheels.

The invention consists further in the matters hereinafter described and more particularly set forth in the appended claims.

In the accompanying drawings—

Figure 1:
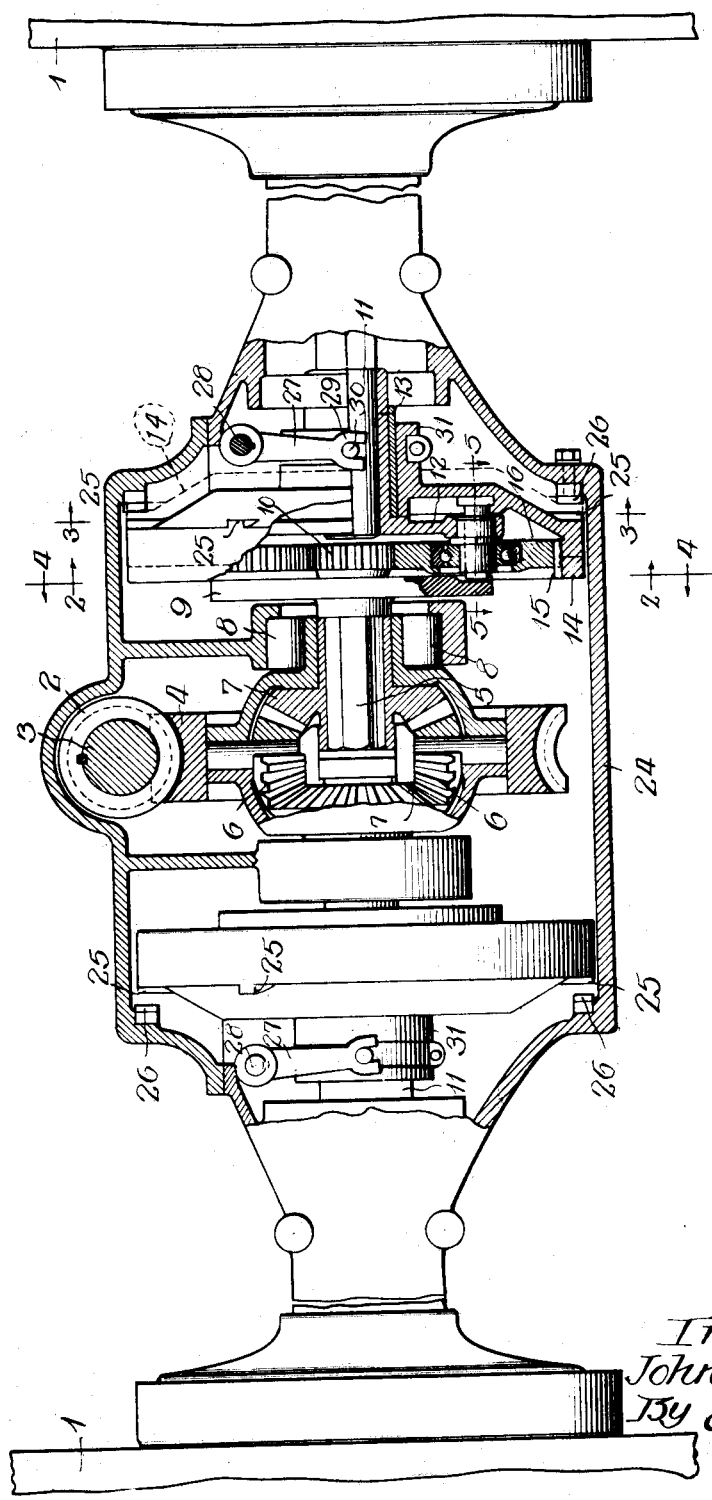
Figure 1 is a view of the structure constituting the live rear axle of a motor vehicle and showing incorporated therein and on opposite sides of the differential mechanism a speed reducing mechanism of my invention.
Figure 6:
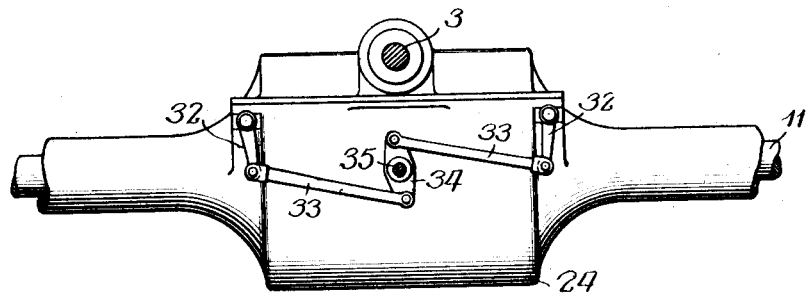
Fig. 6 is a front view of the single casing inclosing or housing the differential mechanism and the two speed reducing mechanisms of my invention, and showing the lever arrangement for shifting parts of said speed reducing mechanisms simultaneously.

In Fig. 1 of the drawings, I have shown the structure constituting the live rear axle of a motor vehicle, such as a truck, and having incorporated therein a speed reducing mechanism of my invention between each rear traction wheel 1 and the differential mechanism. By an arrangement of levers, to be hereinafter described, both speed reducing mechanisms may be shifted simultaneously so that both rear traction wheels 1 of the vehicle may be thrown at the same time into either truck speed or tractor speed at the will of the operator from the driver's seat or cab of the car.

The differential mechanism, as shown, is of the worm drive type, and comprises a worm 2 on the propeller shaft 3, which extends forward and is connected with the motor or engine of the vehicle in the usual manner. Said worm 2 meshes with a worm wheel 4 rotatably mounted on the opposed ends of the inner sections 5, 5 of the live axle. Said worm wheel 4 is made hollow and carries within it a plurality of beveled pinions 6, 6, which mesh with beveled gear wheels 7, 7 on opposite sides of said pinions and which are fixed on each shaft section 5 to rotate therewith. The beveled gear wheels 7 have elongated hubs on which the worm wheel 4 is rotatably mounted, there being antifriction bearings 8 for such parts.

Figure 2:
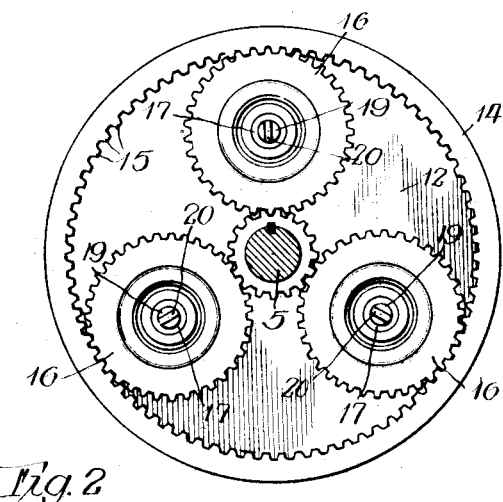
Fig. 2 is a sectional view taken on line 2—2 of Fig. 1.
Figure 3:
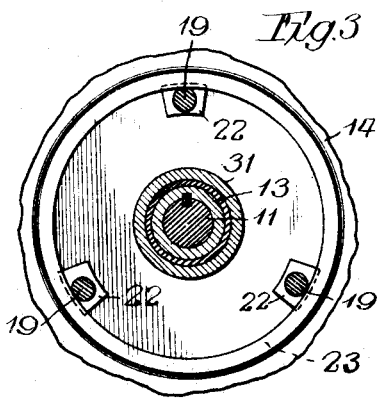
Fig. 3 is a sectional view taken on line 3—3 of Fig. 1.
Figure 4:
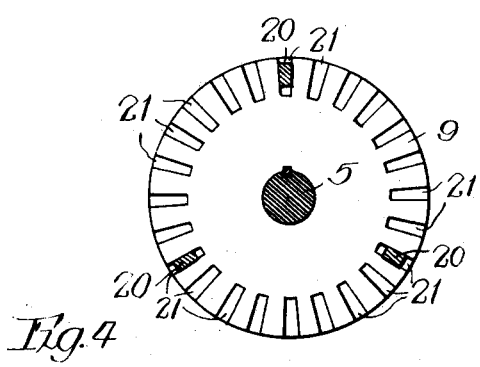
Fig. 4 is a sectional view taken on line 4—4 of Fig. 1.

Each speed reducing mechanism of my invention is constructed as follows. The shaft sections 5 extend beyond the bearings 8, and each is there provided with an annular plate 9 and a gear pinion 10, both fixed to the shaft section to rotate therewith. The other shaft section 11 of that portion of the live axle between each rear vehicle wheel 1 and the differential mechanism has its inner end terminating short of the alined shaft section 5, as shown in Fig. 1. Fixed on the inner end of said shaft section 11 to rotate therewith is an annular plate 12 having a diameter substantially equal to that of the plate 9 and being opposed to the same. Said plate 12 is fixed to a sleeve 13 surrounding said shaft section 11 and fixed thereto as by being splined. Loosely and slidably mounted on said sleeve 13 is an annular member 14 having a diameter greater than the plate 12 and extending over the same. Said member 14 has internal gear teeth 15 in its annular portion surrounding the outer edge of said plate, as shown. Mounted on said plate 12 are a plurality of gear wheels 16 planetarily arranged and interposed between the plates 9 and 12 and meshing with the gear pinion 10 and the internal gear teeth 15, as shown in Figs. 1 and 2.

Figure 5:
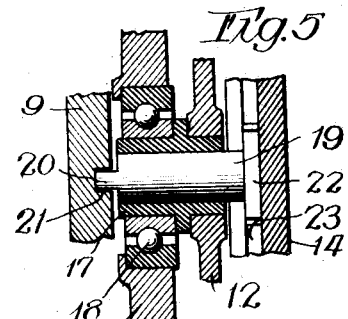
Fig. 5 is an enlarged fragmentary sectional view taken on line 5—5 of Fig. 1.

Each gear wheel 16 is mounted on the plate 12 in the following manner. Secured to and projecting laterally from said plate 12 is a sleeve 17, on which the gear wheel is loosely mounted, there being an antifriction bearing 18 between the sleeve and the gear wheel, as shown in Figs. 1 and 5. A cylindric pin 19 is slidably mounted in said sleeve 17, and is provided at its inner end with a straight tooth or projection 20 to enter any one of a plurality of radially arranged slots 21 in the opposed flat face of the plate 9 to lock the latter to the plate 12. At the other end of the pin 19 is a flat segmental shaped flange or head 22, which engages in an annular groove 23 provided in the gear member 14. Thus, when the gear member 14 is shifted laterally away from the plate 12, the ends 20 of the pins 19 will be withdrawn from the slots in the plate 9 and unlock such plates, so that one may have rotative movement with respect to the other when it is desired to reduce the speed of the rear wheels of the vehicle less than brought about by the transmission mechanism in the propeller shaft.

There are two speed reducing mechanisms of my invention on opposite sides of the differential mechanism, and both are constructed and operated alike. By making the mechanisms of the planetary type, both are compact and the overall dimensions reduced to be within the size of the differential mechanism. Moreover, said mechanisms may be located closely adjacent the differential mechanism, which permits the use of a single hollow casing 24 to inclose or house both of the speed reducing mechanisms as well as the interposed differential mechanism. This enables all of such parts to be lubricated at one time and from one place.

To hold the internal gear member 14 against rotation when the plates 9 and 12 are unlocked, I provide the gear member on the outside thereof with a plurality of radially arranged teeth or projections 25 adapted to enter complementary shaped grooves 26 formed in the casing 24, as shown in Fig. 1.

The structure described operates as follows. When the parts occupy the positions shown in Fig. 1, the pins 19 engage the plate 9 and lock the plates 9 and 12 together. The internal gear member 14 is then free of the slots 26 so as to rotate in unison with the plates 9 and 12 when the shaft sections 5 and 11 are turned by the propeller shaft 3. Thus the parts rotate as a compact mass, and the shaft sections 5 and 11 are rotated at the same rate of speed as required when using the vehicle for the purposes for which it is originally designed. If the vehicle is a truck, it will be driven at truck speed. To change from truck speed to tractor speed, that is, have the rear wheels of the vehicle rotate slower than at truck speed, the gear member 14 is shifted away from the plate 12 until its teeth 25 engage the slots 26. This withdraws the pins 19 out of locking engagement with the plate 9 and holds the gear member 14 against rotation. When the parts occupy such positions, as shown in dotted lines in Fig. 1, power is transmitted from the shaft section 5 to the shaft section 11 through the gear pinion 10, gear wheels 16, and internal gear member 14, the speed of the shaft section 11 being slower than that of the shaft section 5, and consequently the rear wheels of the vehicle rotate slowly enough for tractor purposes.

To permit the gear members 14 of both speed reducing mechanisms to be shifted simultaneously, I provide each mechanism with two arms 27 keyed to a rock shaft 28 journaled in said casing 24. The lower ends of the arms are bifurcated or provided with yokes 29 to engage studs 30 on a slip ring on the hub 31 of the internal gear member 14. Each rock shaft 28 extends out beyond the casing 24 at the side facing the front of the vehicle and is there provided with an arm 32 connected by a link 33 with a cross-arm 34 on a rock shaft 35, which extends forward to a point adjacent the driver's seat and there connected in a suitable manner with an operating handle or lever within convenient reach of the operator so that said speed reducing mechanisms may be shifted simultaneously to throw the vehicle into either tractor or truck speed whenever desired.

By the combination of a differential mechanism of the worm drive type and speed reducing mechanisms of the planetary gear wheel type, as shown and described, a greater reduction of speed for the rear or traction wheels of the vehicle is gained, and increased traction power of said wheels is produced. Moreover, by a differential mechanism of that type, a straight line connection is permitted between the propeller shaft and the worm of the differential mechanism.

While I have shown and described herein in detail a speed reducing mechanism of my invention, it is to be of course understood that the details of construction and arrangement of parts may be variously changed and modified without departing from the spirit and scope of my invention.

I claim as my invention:

1. In combination in a motor vehicle, a propeller shaft, two traction wheels, a differential mechanism between the propeller shaft and said traction wheels and including a main worm wheel and a worm on the propeller shaft in mesh with said worm wheel, a power transmitting connection between said differential mechanism and said traction wheels, including two speed reducing mechanisms, one between each traction wheel and said differential mechanism and both located exterior of said wheels, said speed reducing mechanisms each including shiftable means whereby the traction wheels may either be driven direct from the differential mechanism or at a reduced speed through said speed reducing mechanism, and means connecting both shiftable means together whereby the same may be operated simultaneously.

2. In combination in a motor vehicle, a propeller shaft, two traction wheels, a differential mechanism between the propeller shaft and said traction wheels and including a main worm wheel and a worm on the propeller shaft in mesh with said worm wheel, a power transmitting connection between said differential mechanism and said traction wheels, including two speed reducing mechanisms, one between each traction wheel and said differential mechanism and both located exterior of said wheels, said speed reducing mechanisms each having a gear train planetarily arranged and shiftable means whereby the traction wheels may either be driven direct from the differential mechanism or at a reduced speed through the gear trains of said speed reducing mechanisms, and means connecting said shiftable means together whereby the same may be operated simultaneously.

3. In combination with two alined shaft sections of the live axle of a motor vehicle between the differential mechanism and the traction wheel driven by said live axle, a gear pinion and an annular member fixed on one of said shaft sections, a second annular member fixed on the other shaft section, a gear member slidably and loosely mounted on said last named shaft section and having internal gear teeth, a plurality of gear wheels planetarily arranged and carried by said second annular member and meshing with said gear pinion and said internal gear teeth, means carried by said second annular member and connected with said gear member and operating through said gear pinions to be moved into and out of locked engagement with said first annular member upon shifting said gear member toward and from said annular members, means for shifting said gear member, and means for holding said gear member against rotation when said annular members are unlocked.

4. In combination with the two alined shaft sections of the live axle of a motor vehicle between the differential mechanism and the traction wheel driven by said live axle, a gear pinion and an annular member fixed on the end of one of said shaft sections, a second annular member fixed on the end of the other shaft section, a gear member slidably and loosely mounted on said last named shaft section and having an annular flange with internal gear teeth extending over said second annular member, a plurality of gear wheels carried by said second annular member and being planetarily arranged between said annular members and meshing with said gear pinion and said internal gear teeth, endwise movable members movable by said gear member and slidably mounted in said second annular member and extending through said gear wheels and to be moved into and out of engagement with locking slots in said first annular member, means for shifting said gear member toward and from said annular members, and means for holding said gear member against rotation when said annular members are unlocked.

5. In combination with the two alined shaft sections of the live axle of a motor vehicle between the differential mechanisms and the traction wheel driven by said live axle, a gear pinion and an annular member fixed on one of said shaft sections, a second annular member fixed on the other shaft section, a gear member slidably and loosely mounted on said last named shaft section and having internal gear teeth, a plurality of gear wheels planetarily arranged and carried by one of said annular members and meshing with said gear pinion and said internal gear teeth, shiftable members connected with said gear member and operable through said gear pinions and moved by said gear member upon the shifting thereof to lock and unlock said annular members, means for shifting said gear member, and means for holding said gear member against rotation while said annular members are unlocked.

6. In combination with the two alined shaft sections of the live axle of a motor vehicle between the differential mechanism and the traction wheel driven by said axle, a gear pinion and an annular plate fixed on one of said shaft sections, an annular plate fixed on the other shaft section, a gear member loosely mounted on said last named shaft section and having internal gear teeth, a plurality of gear wheels planetarily arranged and carried by the plate on said last named shaft section and meshing with said gear pinion and said internal gear teeth, shiftable means adapted when moved in one direction to lock said plates together and when moved in the opposite direction to unlock said plates, and means for holding said internal gear member against rotation when said plates are unlocked.

7. In combination with the two alined shaft sections of the live axle of a motor vehicle between the differential mechanism and the traction wheel driven by said live axle, a gear pinion and an annular plate fixed on one of said shaft sections, an annular plate fixed on the other shaft section, a gear member loosely and slidably mounted on the last named shaft section and having internal gear teeth, a plurality of gear wheels planetarily arranged and carried by one of said plates and meshing with said gear pinion and said internal gear teeth, a plurality of pins slidably mounted in one of said plates to engage slots in the other plate for locking said plates together, means connecting said pins with said internal gear member for moving said pins into and out of engagement with the slotted plate upon the shifting of said gear member, and means for locking said gear member against rotation when said plates are unlocked.

8. In combination with the two alined shaft sections of the live axle of a motor vehicle between the differential mechanism and the traction wheel driven by said axle, a gear member and an annular plate fixed on one of said shaft sections, an annular plate fixed on the other shaft section, a gear member loosely and slidably mounted on the last named shaft section and having internal gear teeth, a plurality of gear wheels planetarily arranged and carried by one of said plates and meshing with said gear pinion and said internal gear teeth, a plurality of pins slidably mounted in the plate carrying said gear wheels to engage slots in the other plate for locking said plates together, said pins having heads engaging an annular groove in said internal gear member so that the pins will be moved into and out of locking engagement with the slotted plate upon the shifting of said gear member, means for engaging said gear member and holding the same against rotation when the pins are out of engagement with the slotted plate, and means for shifting said gear member.

9. In combination with the two alined shaft sections of the live axle of a motor vehicle between the differential mechanism and the traction wheel driven by said axle, a gear pinion and an annular plate fixed on one of said shaft sections, an annular plate fixed on the other shaft sections, a gear member loosely and slidably mounted on the last named shaft section and having internal gear teeth, a plurality of gear wheels planetarily arranged and carried by the last named plate and meshing with said gear pinion and said internal gear teeth, a plurality of pins slidably mounted on the last named plate and extending through the hubs of said gear wheels to engage slots in the other plate for locking the plates together, said pins having heads engaging an annular groove in the gear member so that the pins may be moved into and out of locking engagement with the slotted plate in the shifting of said gear member, a hollow casing housing said differential mechanism and said gear member and having fixed parts to engage said gear member to hold the same against rotation when the pins are withdrawn from said slotted plate, and means for shifting said gear member.

In testimony that I claim the foregoing as my invention, I affix my signature, this 2nd day of December, A. D. 1919.

JOHN JANICKI.